(12) United States Patent
Bergogne et al.

(10) Patent No.: US 11,152,865 B2
(45) Date of Patent: Oct. 19, 2021

(54) POWER CONVERTER

(71) Applicant: Commissariat à l'Energie Atomique et aux Energies Alternatives, Paris (FR)

(72) Inventors: Dominique Bergogne, Grenoble (FR); Pierre Perichon, Grenoble (FR); Léo Sterna, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/947,367

(22) Filed: Jul. 29, 2020

(65) Prior Publication Data

US 2021/0036624 A1 Feb. 4, 2021

(30) Foreign Application Priority Data

Jul. 30, 2019 (FR) ...................................... 1908701

(51) Int. Cl.
*H02M 3/335* (2006.01)
*H02M 7/219* (2006.01)
(Continued)

(52) U.S. Cl.
CPC ....... *H02M 3/33584* (2013.01); *H02M 7/219* (2013.01); *H02M 1/0003* (2021.05);
(Continued)

(58) Field of Classification Search
CPC .... H02M 3/01; H02M 3/015; H02M 3/33569; H02M 3/33573; H02M 3/33576; H02M 3/337
(Continued)

(56) References Cited

U.S. PATENT DOCUMENTS 5,625,539 A * 4/1997 Nakata ................ H02M 7/4807
363/132
9,318,967 B2 * 4/2016 Xiong ................... H02M 3/337
(Continued)

FOREIGN PATENT DOCUMENTS

WO 2019064259 A1 4/2019

OTHER PUBLICATIONS

Partial Preliminary Search Report for French Application No. 1908701 dated Apr. 16, 2020, 5 pages.
(Continued)

*Primary Examiner* — Gary A Nash
(74) *Attorney, Agent, or Firm* — Moreno IP Law LLC

(57) ABSTRACT

The instant disclosure concerns a power converter including: a primary stage (110) including at least one first cut-off switch ($S_{11}$, $S_{12}$, $S_{13}$, $S_{14}$); a control circuit (112) capable of applying a first control signal to said at least ore first switch; a secondary stage (130) including at least one second cut-off switch ($S_{21}$, $S_{22}$, $S_{23}$, $S_{24}$); a control circuit (132) capable of applying a second control signal to said at least one second switch; a power transmission stage (120) coupling the primary stage (110) to the secondary stage (130), wherein the control circuit (132) of the secondary stage is electrically isolated from the control circuit (112) of the primary stage.

8 Claims, 5 Drawing Sheets

(51) Int. Cl.
 *H02M 1/00* (2006.01)
 *H02M 3/00* (2006.01)
(52) U.S. Cl.
 CPC .............. *H02M 3/01* (2021.05); *H02M 3/015* (2021.05); *H02M 3/33569* (2013.01); *H02M 3/33573* (2021.05); *H02M 3/33576* (2013.01); *H02M 7/2195* (2021.05)
(58) Field of Classification Search
 USPC .................. 363/21.02, 21.03, 78, 84, 95, 98
 See application file for complete search history.

(56) References Cited

U.S. PATENT DOCUMENTS

| | | | | |
|---|---|---|---|---|
| 9,356,523 | B2* | 5/2016 | Yoshida | H02M 3/3353 |
| 10,050,534 | B1 | 8/2018 | Murthy-Bellur et al. | |
| 10,122,367 | B1* | 11/2018 | Albertini | H02M 1/088 |
| 2012/0026754 | A1* | 2/2012 | Ye | H02M 3/285 |
| | | | | 363/17 |
| 2016/0126844 | A1* | 5/2016 | Tschirhart | H02M 3/33592 |
| | | | | 363/17 |
| 2018/0198380 | A1* | 7/2018 | Sterna | H02M 7/219 |
| 2018/0198381 | A1* | 7/2018 | Sterna | H02M 1/4233 |

OTHER PUBLICATIONS

M. Evzelman et al., "A Generic Model of a Gyrator Based APFC," 24th Annual IEEE Applied Power Electronics Conf. & Expo., Feb. 15, 2009, pp. 755-759.

* cited by examiner

POWER CONVERTER

FIELD

The present disclosure relates to the field of power converters, and more particularly aims at the field of so-called phase-controlled converters.

BACKGROUND

A phase-controlled power convener typically comprises a primary stage modulating the input power at a relatively high frequency called cut-off frequency, followed by an isolation stage capable of transmitting the power modulated by the primary stage, followed by a secondary stage demodulating the power transmitted by the isolation stage and delivering the output power of the converter. Each of the primary and secondary stages comprises one of a plurality of switches controlled in switched mode, also called cut-off switches. The control of the power transfer between the input and the output of the converter is performed by varying the phase shift between the control of the switch(es) of the primary stage and the control of the switch(es) of the secondary stage, the two stages being controlled at the same frequency. Examples of phase-controlled power converters are particularly described in patent applications FR3061817 and FR3061818 previously filed by the applicant.

Conventionally, a phase-controlled converter comprises a control circuit common to the primary and secondary stages, capable of implementing voltage and/or current measurements in each of the primary and secondary stages, of generating control laws for the switches of the primary and secondary stages, and of ensuring the distribution of the control signals to the primary and secondary stages. Due to the isolation between the primary and secondary stages, the common control circuit is relatively complex and expensive. In particular, isolated voltage and/or current measurements and isolated communication components between the primary stage and the secondary stage, for example, optocouplers or RF isolators, generally have to be provided. The links of the primary stage and of the secondary stage to a same common control circuit raise a particular issue when the primary and secondary stages are physically separated from each other, for example, in the case of a wireless pow er transmission system.

It would be desirable to overcome all or part of the disadvantages of known phase-controlled converters.

SUMMARY

For this purpose, an embodiment provides a power converter comprising:
a primary stage comprising at least one first cut-off switch;
a control circuit capable of applying a first control signal to said at least one first switch;
a secondary stage comprising at least one second cut-off switch;
a control circuit capable of applying a second control signal to said at least one second switch;
a power transmission stage coupling the primary stage to the secondary stage,
wherein the control circuit of the secondary stage is electrically isolated from the control circuit of the primary stage, and wherein the control circuit of the secondary stage is configured to, during an operating range selection phase, determine, based on a measurement of an output current of the secondary stage or of an output power of the secondary stage, in which operating range among ranges $[-\pi; -\pi/2]$, $[-\pi/2; 0]$, $[0; \pi/2]$, and $[\pi/2; \pi]$ a phase shift $\varphi$ between the first signal for controlling said at least one first switch and a signal for controlling said at least one second switch is located,
wherein the control circuit of the secondary stage is capable, during the operating range selection phase, of:
a) determining a direction of transfer of an electric power between the primary stage and the secondary stage;
b) determining the sign of a ratio $\Delta X/\Delta\varphi$ between a variation DX of the electric power transferred between the primary stage and the secondary stage or of an output current ($I_s$) of the secondary stage and a corresponding variation $\Delta\varphi$ of the phase of the second signal for controlling the second switch; and
c) modifying the phase of the second signal for controlling said at least one second switch according to the transfer direction determined at step a) and to the sign of the ratio $\Delta X/\Delta\varphi$ determined at step b), to place phase shift $\varphi$ within range $[-\pi/2; 0]$, or $[0; \pi/2]$.

According to an embodiment, the control circuit of the secondary stage is further configured to, during the operating range selection phase, modify the phase of the second control signal of the second switch to place phase shift $\varphi$ in a desired operating range.

According to an embodiment, the primary stage comprises four first switches forming a first H bridge controlled by the control circuit of the primary stage, and the second stage comprises four second switches forming a second H bridge controlled by the control circuit of the secondary stage.

According to an embodiment, the isolated power transmission stage comprises a transformer comprising a primary winding and a secondary winding.

According to an embodiment, the control circuit of the secondary stage is configured to, during the synchronization phase, control the second H bridge to short-circuit the secondary winding of the transformer.

According to an embodiment, the control circuit of the primary stage is configured to measure an AC input signal of the converter, and accordingly adapt a duty cycle between control signals of the first and second arms of the first H bridge to ensure a sinusoidal absorption of the input current of the converter.

According to an embodiment, the control circuit of the secondary stage is configured to, based on a measurement of a current or of a voltage in the secondary stage, determine the variation of an AC input signal of the converter, and accordingly adapt a duty cycle between control signals of first and second arms of the first H bridge to ensure a sinusoidal absorption of the input current of the converter.

According to an embodiment, the control circuit of the primary stage and the control circuit of the secondary stage are capable of controlling the first switch and the second switch in switched mode at a frequency in the range from 10 kHz to 10 MHz.

Another embodiment provides a power converter comprising:
a primary stage comprising at least one first cut-off switch;
a control circuit capable of applying a first control signal to said at least one first switch;
a secondary stage comprising at least one second cut-off switch;
a control circuit capable of applying a second control signal to said at least one second switch; and
a power transmission stage coupling the primary stage to the secondary stage, wherein the control circuit of the secondary stage is electrically isolated from the control circuit of the primary stage, and wherein the control circuit of the secondary stage is configured to, during an operating range selection phase, determine, based on a measurement of an output current of the secondary stage or of an output power of the secondary stage, in which operating range a phase shift φ between the first signal for controlling said at least one first switch and a signal for controlling said at least one second switch is located.

According to an embodiment, the control circuit of the secondary stage is further capable of, during the operating range selection phase, modify the phase of the second signal for controlling the second switch to place phase shift φ in a desired operating range.

According to an embodiment, the control circuit of the secondary stage is capable of, during the operating range selection phase.

a) determining a direction of transfer of an electric power between the primary stage and the secondary stage;
b) determining the sign of a ratio ΔX/Δφ between a variation ΔX of the electric power transferred between the primary stage and the secondary stage or of an output current of the secondary stage and a corresponding variation Δφ of the phase of the second signal for controlling the second switch; and
c) modifying the phase of the second signal for controlling the second switch according to the transfer direction determined at step a) and to the sign of the ratio ΔX/Δφ determined at step b).

According to an embodiment, the control circuit of the secondary stage is configured to, at step c):
if the transfer direction determined at step a) is positive and if the sign of the ratio ΔX/Δφ determined at step b) is negative, apply a −π/2 phase shift to the second signal for controlling said at least one second switch;
if the transfer direction determined at step a) is positive and if the sign of the ratio ΔX/Δφ determined at step b) is positive, apply no phase shift to the second signal for controlling said at least one second switch;
if the transfer direction determined at step a) is negative and if the sign of the ratio ΔX/Δφ determined at step b) is positive, apply a π/2 phase shift to the second signal for controlling said at least one second switch; and
if the transfer direction determined at step a) is negative and if the sign of the ratio ΔX/Δφ determined at step b) is negative, apply a π phase shift to the second signal for controlling said at least one second switch.

According to an embodiment, the control circuit of the secondary stage is configured to repeat the operating range selection phase each time the converter is started.

According to an embodiment, the control circuit of the secondary stage is further configured to, during a synchronization phase, based on a measurement of a current or of a voltage in the secondary stage, generate a third signal representative of the first control signal applied to said at least one first switch.

According to an embodiment, the control circuit of the secondary stage is further configured to, during the synchronization phase, adapt the second signal for controlling the second switch according to the third signal, to synchronize the control of the second switch on that of the first switch.

According to an embodiment, the control circuit of the secondary stage is configured to periodically repeat the synchronization phase.

According to an embodiment, the primary stage comprises four first switches forming a first H bridge controlled by the control circuit of the primary stage, and the second stage comprises four second switches forming a second H bridge controlled by the control circuit of the secondary stage.

According to an embodiment, the isolated power transmission stage comprises a transformer.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the applications that may be made of the described power conveners have not been detailed, the described embodiments being compatible with usual power convener applications. Further, the circuits for controlling the switches of the primary and secondary stages of the described converters are not detailed, the forming of such control circuits being within the abilities of those skilled in the art based on the functional indications of the present description.

Unless specified otherwise, when reference is made to two elements connected together, this signifies a direct connection without any intermediate elements other than conductors, and when reference is made to two elements coupled together, this signifies that these two elements can be connected or they can be coupled via ore or more other elements.

Unless specified otherwise, the expressions "around", "approximately", "substantially" and "in the order of" signify within 10%, and preferably within 5%.

According to an aspect of the described embodiments, it is provided to form a phase-controlled power converter comprising a first control circuit for controlling the primary stage, and a second control circuit for controlling the secondary stage, the first and second control circuits being entirely separated from each other, with no direct communication between the two circuits.

Figure 1:
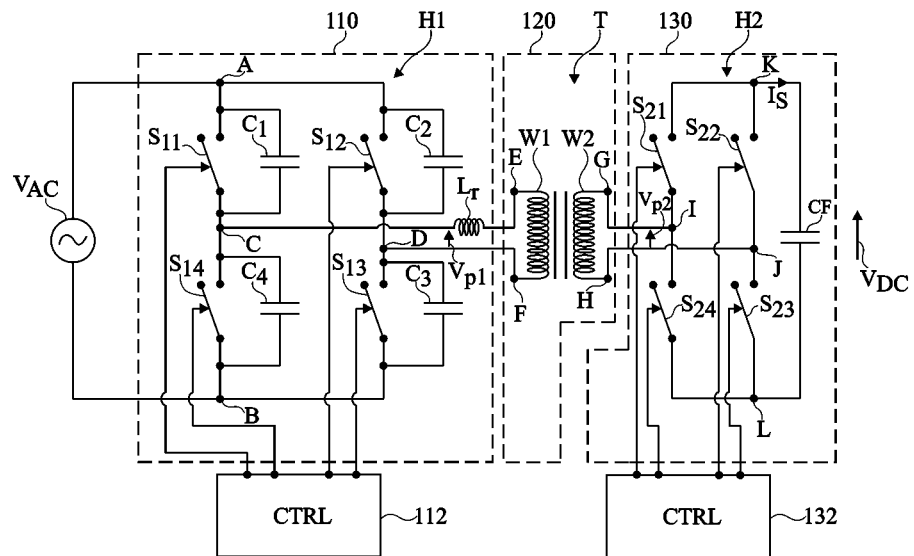
FIG. 1 is an electric diagram of an example of a phase-controlled power converter according to an embodiment.

FIG. 1 is an electric diagram of an example of a phase-controlled power converter according to an embodiment. An AC/DC convener is considered in the present example.

The converter of FIG. 1 comprises a primary stage 110, followed by an isolation stage 120, followed by a secondary stage 130.

In the present example, primary stage 110 comprises a first controlled H bridge H1, or primary bridge, and a series inductance $L_r$, isolation stage 120 comprises a transformer T, and secondary stage 130 comprises a second controlled H bridge H2. or secondary bridge.

Bridge H1 is formed of four controlled witches $S_{11}$, $S_{12}$, $S_{13}$ and $S_{14}$, for example, identical (to within manufacturing dispersions), each comprising two main conduction nodes and at least one control node. Switches $S_{11}$ and $S_{14}$ are series-coupled, by their conduction nodes, between input nodes A and B of the bridge. Switches $S_{12}$ and $S_{13}$ are series-coupled, by their conduction nodes, between nodes A and B, in parallel with the branch comprising switches $S_{11}$ and $S_{14}$. The junction point C of switches $S_{11}$ and $S_{14}$ defines a first output node of the bridge, and the junction point D between switches $S_{12}$ and $S_{13}$ defines a second output node of the bridge. More particularly, in the shown example, switch $S_{11}$ has a first conduction node connected to node A and a second conduction node connected to node C, switch $S_{14}$ has a first conduction node connected to node C and a second conduction node connected to node B, switch $S_{12}$ has a first conduction node connected to node A and a second conduction rode connected to node D, and switch $S_{13}$ has a first conduction node connected to node D and a second conduction node connected to node B. In the present example, switches $S_{11}$, $S_{12}$, $S_{13}$, and $S_{14}$ are bidirectional for the current and the voltage.

Input nodes A and B of bridge H1 directly receive, that is, with no intermediate diode rectifying stage, the AC input voltage $V_{AC}$ of the converter, for example, a sinusoidal voltage having a frequency in the order of 50 or 60 Hz, for example, the mains voltage.

In this example, primary stage 110 further comprises four capacitors $C_1$, $C_2$, $C_3$, $C_4$, for example, identical (to within manufacturing dispersions), respectively coupled in parallel with switches $S_{11}$, $S_{12}$, $S_{13}$, $S_{14}$ of bridge H1. More particularly, each capacitor $C_i$, i being an integer in the range front 1 to 4, has its electrodes respectively connected to the conduction nodes of the switch $S_i$, of same index i. As a variant, capacitors $C_1$, $C_2$, $C_3$, $C_4$ may be omitted, capacitors $C_1$, $C_2$, $C_3$, $C_4$ then being only formed by the stray capacitances of switches $S_{11}$, $S_{12}$, $S_{13}$, $S_{14}$.

Transformer T comprises a primary winding W1 and a secondary winding W2, magnetically coupled.

Ends E and F of primary winding W1 are respectively coupled to output nodes C and D of bridge H1. More particularly, in the shown example, end E of primary winding W1 is coupled to node C via inductance L, and end F of primary winding W1 is connected to node D. In the shown example, inductance $L_r$ has a first end connected to node E and a second end connected to node C. Inductance $L_r$ may be an inductive component specifically connected to primary winding W1 or may only be formed by the leakage inductance of the transformer.

Bridge H2 is formed of four controlled switches $S_{21}$, $S_{22}$, $S_{23}$, and $S_{24}$, for example, identical (to within manufacturing dispersions), each comprising two main conduction nodes and at least one control node. Switches $S_{21}$, $S_{22}$, $S_{23}$, and $S_{24}$ are for example quasi-bidirectional switches, that is, switches capable of conducting current in both directions, but only enabling to control the current in one direction, that is, which can only be controlled to die off state when a voltage having a determined polarity is applied between their conduction nodes (in other words, switches which are bidirectional in terms of current but unidirectional in terms of voltage). Switches $S_{21}$ and $S_{22}$ are series-coupled, by their conduction nodes, between input nodes I and J of the bridge. Switches $S_{23}$ and $S_{24}$ series-coupled, by their conduction nodes, between nodes I and J, in parallel with the branch comprising switches $S_{12}$ and $S_{22}$. The junction point K of switches $S_{21}$ and $S_{22}$ defines a first output node of the bridge, and the junction point L of switches $S_{23}$ and $S_{24}$ defines a second output node of the bridge. More particularly, in the shown example, switch $S_{21}$ has a first conduction node connected to node I and a second conduction node connected to node K, switch $S_{22}$ has a first conduction node connected to node J and a second conduction node connected to node K, switch $S_{24}$ has a first conduction node connected to node I and a second conduction node connected to node L, and switch $S_{23}$ has a first conduction node connected to node L and a second conduction node connected to node J.

The input nodes I and J of bridge H2 are respectively coupled to ends G and H of secondary winding W2 of transformer T. In the shown example, end G of winding W2 is connected to node I and end H of winding W2 is connected to node J.

In the example of FIG. 1, the converter further comprises an output filtering capacitor CF, at the output of bridge H2. In the shown example, the electrodes of capacitor CF are respectively connected to the output nodes K and L of bridge H2, which form nodes for delivering the DC output voltage $V_{DC}$ of the converter.

In the example of FIG. 1, the converter comprises a circuit 112 (CTRL) for controlling primary stage 110, capable of controlling the switches $S_{11}$, $S_{12}$, $S_{13}$, $S_{14}$ of primary bridge H1, and a circuit 132 (CTRL) for controlling secondary stage 130, capable of controlling the switches $S_{21}$, $S_{22}$, $S_{23}$, $S_{24}$ of secondary bridge H2.

Control circuits 112 and 132 are totally separated from each other. In other words, control circuits 112 and 132 are coupled to each other only via isolation stage 120, formed in the present example by transformer T.

Although this is not detailed in the drawing, control circuit 112 may comprise voltage and/or current measurement circuits within the primary stage, and circuits capable of processing the data delivered by the measurement circuits and of accordingly generating signals for controlling the switches $S_{11}$, $S_{12}$, $S_{13}$, $S_{14}$ of the primary stage. Similarly, control circuit 132 may comprise voltage and/or current measurement circuits within the secondary stage, and circuits capable of processing the data supplied by the measurement circuits and of accordingly generating the signals for controlling the switches $S_{21}$, $S_{22}$, $S_{23}$, $S_{24}$ of the secondary stage.

Figure 2:
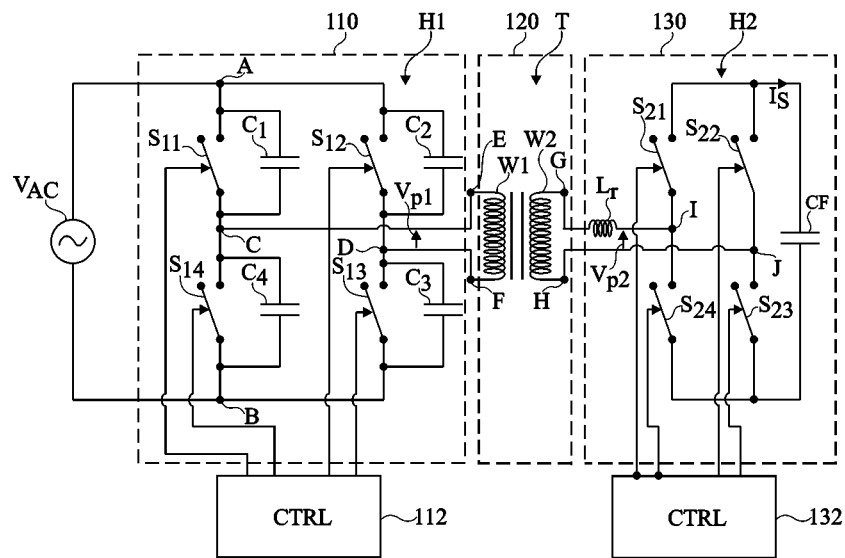
FIG. 2 is an electric diagram of an alternative embodiment of the converter of FIG. 1.

FIG. 2 is an electric diagram illustrating an alternative embodiment of the converter of FIG. 1.

The convener of FIG. 2 differs from the convener of FIG. 1 mainly in that, in the convener of FIG. 2, inductance $L_r$ placed in series with transformer T is located in secondary stage 130 and no longer in primary stage 110. More particularly, in the example of FIG. 2, end G of the secondary winding W2 of transformer T is not directly connected to the input node I of secondary bridge H2, but is coupled to node I via inductance $L_r$. In the shown example, inductance $L_r$ has a first end connected to node G and a second end connected to node I. On the side of primary stage 110, the end E of primary winding W1 may be connected to the output node C of primary bridge H1.

Figure 3:
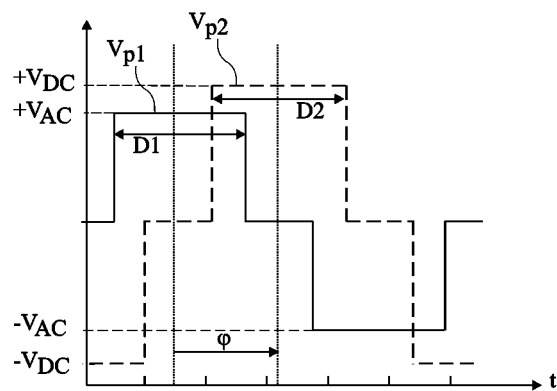
FIG. 3 is a diagram illustrating the operation of the convener of FIG. 1 or 2.

FIG. 3 is a diagram illustrating the operation of the convener of FIG. 1 or 2. FIG. 3 more particularly shows the variation, over time t (in abscissas), of the voltage $V_{p1}$ (in full line) between the output nodes C and D of primary bridge H1 of the convener, and of the voltage $V_{p2}$ (in dashed lines) between the input nodes I and J of die secondary bridge H2 of the converter. In this example, primary and secondary bridges H1 and H2 are controlled substantially at the same frequency. It should be noted that in the example of FIG. 3, due to the relatively high switching frequency of the switches of bridges H1 and H2, input voltage $V_{AC}$ is considered as substantially constant during a switching cycle of bridge H1 or H2. As an example, the switching frequency of the switches of bridges H1 and H2 is at least tea times and preferably at least twenty times greater than the frequency of the AC input voltage $V_{AC}$ of the converter. As an example, the switching frequency of the switches of bridges H1 and H2 is in the range from 10 kHz to 10 MHz, for example, from 100 kHz to 1 MHz.

In the shown example, the control of bridge H1 is a four-phase control. More particularly, each control cycle of bridge H1 comprises the following consecutive phases:
a first phase during which switches $S_{11}$ and $S_{12}$ and kept on and switches $S_{13}$ and $S_{14}$ are kept off, or during which switches $S_{13}$ and $S_{14}$ are kept on and switches $S_{11}$ and $S_{12}$ are kept off ($V_{p1}$=0);
a second phase during which switches $S_{11}$ and $S_{12}$ are kept on and switches $S_{12}$ and $S_{14}$ are kept off ($V_{p1}$=+$V_{AC}$);
a third phase during which switches $S_{11}$ and $S_{12}$ and kept on and switches $S_{13}$ and $S_{14}$ are kept off, or during which switches $S_{13}$ and $S_{14}$ are kept on and switches $S_{11}$ and $S_{12}$ are kept off ($V_{p1}$=0); and
a fourth phase during which switches $S_{12}$ and $S_{14}$ are kept on and switches $S_{11}$ and $S_{13}$ are kept off ($V_{p1}$=-$V_{AC}$).

Similarly, in the present example, the control of bridge H2 is a four-phase control. More particularly, each control cycle of bridge H2 comprises the following consecutive phases:
a first phase during which switches $S_{21}$ and $S_{22}$ and kept on and switches $S_{23}$ and $S_{24}$ are kept off, or during which switches $S_{21}$ and $S_{24}$ are kept on and switches $S_{21}$ and $S_{22}$ are kept off ($V_{p2}$=0);
a second phase during which switches $S_{21}$ and $S_{23}$ are kept on and switches $S_{22}$ and $S_{24}$ are kept off ($V_{p2}$=+$V_{DC}$);
a third phase during which switches $S_{21}$ and $S_{22}$ and kept on and switches $S_{23}$ and $S_{24}$ are kept off, or during which switches $S_{23}$ and $S_{24}$ are kept on and switches $S_{21}$ and $S_{22}$ are kept off ($V_{p2}$=0); and
a fourth phase during which switches $S_{22}$ and $S_{24}$ are kept on and switches $S_{21}$ and $S_{23}$ kept off ($V_{p2}$=-$V_{DC}$).

The switching of bridges H1 and H2 results in generating a high-frequency AC current at the level of transformer T, allowing a power transfer from the primary stage to the secondary stage or from the secondary stage to the primary stage. It should be noted that although, in the example illustrated in FIG. 3, the control of bridges H1 and H2 is a four-phase control imposing three-level AC voltages $V_{p1}$ and $V_{p2}$, the described embodiments are not limited to this specific case. As a variant, the control of the bridges H1 and H2 may be a two-phase control (respectively corresponding to the second and fourth phases of the above-described examples), also called fullwave control, resulting in generating two-level AC voltages $V_{p1}$ and $V_{p2}$. The phases of the example of FIG. 3 where $V_{p1}$=0 and $V_{p2}$=0 are then omitted.

The power transfer between the primary and the secondary is affected by three independent control variables, that is, the phase shift between the two arms of primary bridge H1 defining a duty cycle D1 on modulated voltage $V_{p1}$, the phase shift between the two arms of secondary bridge H2 defining a duty cycle D2 on modulated voltage $V_{p2}$, and the phase shift φ between the control of primary bridge H1 and the control of secondary bridge H2.

In practice, variable φ is particularly advantageous to control the power transfer without inducing too much stress in the converter.

Figure 4:
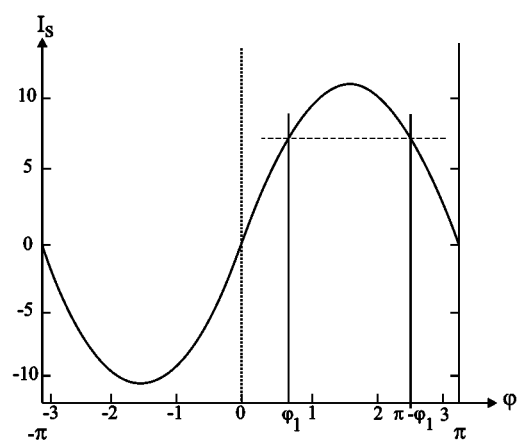
FIG. 4 is another diagram illustrating the operation of the converter of FIG. 1 or 2.

FIG. 4 is a diagram illustrating the output current $I_s$ (in ordinates) of the converter according to phase shift φ (in abscissas), assuming that D1 and D2 are fixed.

The field of definition of phase shift φ is interval [-π; π]. As shown in FIG. 4, current $I_s$ is zero (no power transfer) for a phase shift φ=0, current Is is positive (power transfer from the primary to the secondary) when phase shift φ is within range [0; π], and current $I_s$ is negative (power transfer from the secondary to the primary) when phase shift φ is within range [-π; 0]. In other words, the sign of phase shift φ provides the power transfer direction.

The variation of current $I_s$ is symmetrical with respect to value φ=0. Further, as shown in FIG. 2, in range [0; π], variation of current $I_s$ is symmetrical with respect to value φ=π/2, and, in range [-π; 0], the variation of current his symmetrical with respect to value φ=-π2.

In the shown example, current $I_s$ varies substantially sinusoidally when phase shift φ varies from -π to π.

For a same desired output current value $I_s$, there exist two phase shift values φ1 and π-φ1, and thus two operating points of the converter, enabling to obtain the targeted power transfer. In practice, one of the two operating points should be preferred since it enables to minimize losses and to obtain a better conversion performance. More particularly, to obtain a good conversion performance, phase shift φ should preferably be placed within range [0; π/2] for a power transfer from the primary stage to the secondary stage, and within range [-π/2; 0] for a power transfer from the secondary stage to the primary stage.

In a converter of the type described in relation with FIGS. 1 and 2, an issue is that, in the absence of a direct communication between the control circuit 112 of the primary stage and the control circuit 132 of the secondary stage, at the starting of the converter, neither control circuit 112 nor control circuit 132 knows in which range phase shift φ is located.

According to an aspect of an embodiment, the control circuit 132 of the secondary stage is capable of implementing a method of selection of the operating range enabling to identify the operating range where phase shift φ is located and, if necessary, to modify phase shift φ by adding thereto a predetermined fixed angle to replace phase shift φ in the optimal operating range for the converter operation.

Figure 5:
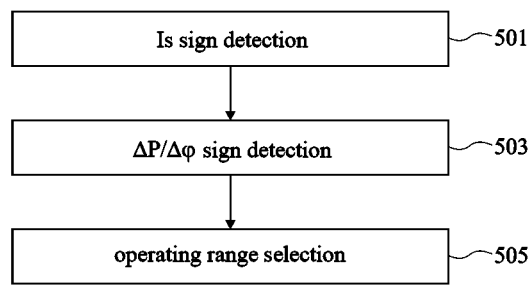
FIG. 5 shows, in the form of blocks, an example of a method of selection of an operating range of a phase-controlled converter according to an embodiment.

FIG. 5 shows, in the form of blocks, an example of an operating range selection method implemented by the control circuit 132 of the secondary stage.

In the absence of a synchronization between the primary and secondary stages, the initial phase shift may take any value φ=φ$_{init}$ in range [-π; π].

The method comprises a step 501 of measurement of the output current $I_s$ of the converter. If the measured current $I_s$ is positive, this means that phase shift φ=φ$_{init}$ is within range

[0; π] and that the converter performs a power transfer from the primary stage to the secondary stage. If the measured current $I_s$ is negative, this means that phase shift $\varphi=\varphi_{init}$ is within range [−π; 0] and that the converter performs a power transfer from the secondary stage to the primary stage.

During a step 502 subsequent to step 501, control circuit 132 applies a local phase variation $\Delta\varphi$ to the control signals of secondary bridge H2. Phase shift $\varphi$ then takes a value $\varphi 1=\varphi_{init}+\Delta\varphi$. During step 502, control circuit 132 further measures the power variation $\Delta P$ at the converter output, caused by the application of local phase variation $\Delta\varphi$. Control circuit 132 then determines the sign of ratio $\Delta P/\Delta\varphi$. Knowing the power transfer curve of the converter, for example, such as illustrated in FIG. 4, and knowing the sign of current $I_s$ for initial phase shift value $\varphi_{init}$, this enables to determine in which operating range phase shift $\varphi=\varphi 1$ is located among ranges [−π; −π/2], [−π/2; 0], [0; π/2], and [π/2; π].

More particularly, in the example of FIG. 4:
if the sign of the current $I_s$ determined at step 501 is positive and if the sign of the ratio $\Delta P/\Delta\varphi$ determined at step 502 is negative, this means that phase shift $\varphi=\varphi 1$ is located within range [π/2; π];
if the sign of the current $I_s$ determined at step 501 is positive and if the sign of the ratio $\Delta P/\Delta\varphi$ determined at step 502 is positive, this means that phase shift $\varphi=\varphi 1$ is within range [0; π/2];
if the sign of the current $I_s$ determined at step 501 is negative and if the sign of the ratio $\Delta P/\Delta\varphi$ determined at step 502 is positive, this means that phase shift $\varphi=\varphi 1$ is within range [−π/2; 0]; and
if the sign of the current $I_s$ determined at step 501 is negative and if the sign of the ratio $\Delta P/\Delta\varphi$ determined at step 502 is negative, this means that phase shift $\varphi=\varphi 1$ is within range [−π; −π/2].

During a step 503 subsequent to step 502, according to the sign of the current $I_s$ determined at step 501 and to the sign of the ratio $\Delta P/\Delta\varphi$ determined at step 502, circuit 132 applies to the control signals of secondary bridge H2 a predetermined fixed phase shift enabling to place the converter in the desired operating range.

It is here assumed, as an example, that a positive power transfer from the primary stage of the secondary stage is desired to be performed. For this purpose, to obtain a good conversion performance, phase shift $\varphi$ should be within range [0; π/2].

Thus, in the present example:
if the sign of the current $I_s$ determined at step 501 is positive and if the sign of the ratio $\Delta P/\Delta\varphi$ determined at step 502 is negative, control circuit 132 applies to the signals for controlling bridge H2 a −π/2 phase shift. Phase shift $\varphi$ then takes a value $\varphi 2=\varphi 1-\pi/2$;
if the sign of the current $I_s$ determined at step 501 is positive and if the sign of the ratio $\Delta P/\Delta\varphi$ determined at step 502 is positive, control circuit 132 applies no phase shift to the signals for controlling bridge H2;
if the sign of the current $I_s$ determined at step 501 is negative and if the sign of the ratio $\Delta P/\Delta\varphi$ determined at step 502 is positive, control circuit 132 applies to the signals for controlling bridge H2 a π/2 phase shift. Phase shift $\varphi$ then takes a value $\varphi 2=\varphi 1+\pi/2$; and
if the sign of the current $I_s$ determined at step 501 is negative and if the sign of the ratio $\Delta P/\Delta\varphi$ determined at step 502 is negative, control circuit 132 applies to the signals for controlling bridge H2 a π phase shift. Phase shift $\varphi$ then takes a value $\varphi=\varphi 1+\pi$.

As a variant, at step 501, the output voltage $V_{DC}$ of the converter may further be measured. If, at the starting of the converter, voltage $V_{DC}$ and current $I_S$ are zero, it can directly be deduced that phase shift $\varphi=\varphi_{init}$ is within range [−π; 0]. Control circuit 132 may then directly apply a π phase shift to the signal for controlling bridge H2. Steps 502 and 503 may then be implemented similarly to what has been described hereabove. This advantageously enables to start charging output capacitor CF from as soon as step 501, without waiting for the completion of step 503.

More generally, if a positive power transfer from the primary stage to the secondary stage is desired to be performed and, at step 501, circuit 132 determines that phase shift $\varphi=\varphi_{init}$ is within range [−π; 0], circuit 132 may directly apply a phase shift equal to π to the signals for controlling secondary bridge H2, before implementing steps 502 and 503. Similarly, is a positive power transfer from the secondary stage to the primary stage is desired to be performed and, at step 501, circuit 132 determines that phase shift $\varphi=\varphi_{init}$ is within range [0; π], circuit 132 may directly apply a phase shift equal to −π to the signals for controlling secondary bridge H2, and then implement steps 502 and 503.

Further, as a variant, instead of measuring the power variation $\Delta P$ at the converter output, caused by the application of local phase variation $\Delta\varphi$, control circuit 132 measures a variation $\Delta I_S$ of the output current of the converter. Control circuit 132 then determines the sign of ratio $\Delta I_s/\Delta\varphi$. The method is then implemented similarly to what has been described hereabove, by replacing the sign of ratio $\Delta P/\Delta\varphi$ with the sign of ratio $\Delta I_s/\Delta\varphi$.

The operating range selection method of FIG. 5 may for example be repeated each time the converter is started, or at any other time.

Once phase shift $\varphi$ has been placed in the right operating range, the control circuit 132 of the secondary stage regulates the output power of the converter by varying the phase of the control signals of secondary bridge H2 (and thus phase shift $\varphi$, since the phase of signals for controlling primary bridge H1 remains unchanged). As an example, control circuit 132 determines a phase set point of secondary bridge H2, which originates from a regulation loop on the output voltage $V_{DC}$ of the converter. To perform this regulation, a simple regulator of proportional-integral (PI) type may be used.

For certain applications, the converter should further be controlled to ensure a sinusoidal absorption of the input current. For this purpose, the control should be synchronized on AC input voltage $V_{AC}$.

In a first embodiment, the management of the sinusoidal absorption of the current is implemented by the control circuit 112 of the primary stage, for which voltage $V_{AC}$ is directly accessible. Control circuit 112 then varies the duty cycle D1 of primary bridge H1 to ensure a sinusoidal absorption of the input current.

In a second embodiment, the management of the sinusoidal absorption of the current is implemented by the control circuit 132 of the secondary stage, for which voltage $V_{AC}$ is not directly accessible.

In this case, control circuit 112 controls the primary bridge according to a fullwave control, with no variation of duty cycle D1. The high-frequency voltage Vp1 imposed by primary bridge H1 then is a square voltage, with a low-frequency amplitude modulation by the AC input source. By voltage and or current measurements at the output of transformer T, the control circuit 132 of the secondary stage detects so-called quiet periods, corresponding to passages of input voltage $V_{AC}$ under a threshold value, for example, a voltage in the order of 30 volts (in absolute value). This enables to have a synchronization at twice the frequency of input voltage $V_{AC}$ (that is, at the frequency of the rectified voltage $V_{AC}$). Control circuit 132 then varies the duty cycle D2 of secondary bridge H2 to ensure a sinusoidal absorption of the input current.

In the case where series inductance $L_r$ is placed at the secondary (configuration of FIG. 2), an image of the voltage $V_{p1}$ imposed by the primary is accessible by control circuit 132 across the secondary winding W2 of the transformer. In this case, the detection of quiet periods (corresponding to the zero crossings of input voltage $V_{AC}$) by circuit 132 may only be performed based on a measurement of the output voltage U(W2) of transformer T.

In the case where series inductance is placed at the primary (configuration of FIG. 1), voltage is not accessible at the output of transformer T. In this case, the detection of quiet periods by circuit 132 may be performed by a measurement of the current I(W2) at the secondary of transformer T.

In a converter of the type described in relation with FIGS. 1 and 2, primary control circuit 112 and secondary control circuit 132 each have their own clock signal generation circuit and share no time reference. In each control circuit, the clock signal is used for the rating of the circuit and for the generation of the signals for controlling the switches of the corresponding stage. The clock generators of circuits 112 and 132 are for example identical to within manufacturing dispersions. However, in practice, due to manufacturing dispersions on the one hand, and to drifts in operation (temperature, aging) on the other hand, there inevitably exists a frequency difference between the clock signal of circuit 112 and the clock signal of circuit 132.

If this difference is sufficiently small, it may be tolerated, the drift being only compensated by the loop of regulation of the output voltage and/or current of the converter.

In the specific case of a converter with a sinusoidal current absorption, the tolerance relative to the frequency difference of the clock signals in the absence of a specific compensation is however relatively low. In practice, the power regulation loop should preferably have a dynamic range at least ten times smaller than the frequency of AC input voltage $V_{AC}$ to avoid any distortion of the absorbed current. If the power regulation loop must also correct the cut-off frequency difference between the two stages (linked to the clock frequency difference between control circuits 112 and 132) with no distortion of the absorbed current, then the cut-off frequency difference between the two stages, also called beat frequency, should also be preferably at least ten times smaller than the frequency of voltage $V_{AC}$. Respectively designating with Fd1 and Fd2 the cut-off frequency of the primary and secondary stages (that is, the cut-off frequency of the switches of bridges H1 and H2) and with Fb=|Fd2−Fd1| the beat frequency between the two stages, relation Fb<$F_{AC}$/10 should be respected, where $F_{AC}$ designates the frequency of AC input voltage $V_{AC}$. Calling Δ the accuracy of the clock generation circuits used in control circuits 112 and 132, the relation between the clock frequency Fc1 of circuit 112 and the clock frequency Fc2 of circuit 132 can be expressed as follows: Fc2=Fc1=Δ*Fc1. Cut-off frequencies Fd1 and Fd2 being generated from clock frequencies Fc1 and Fc2 respectively, this provides relation Fd2=Fd1+Δ*FD1 again, and thus Fb=Δ*Fd1. To respect the above-stated relation Fb<$F_{AC}$/10, relation Δ<$F_{AC}$/(10*Fd1) should thus be respected. Thus, the higher the cut-off frequency, the more accurate the clock generation circuits should be.

It should be noted that in the case of a DC/DC-type converter, the frequency of the input voltage is zero, which frees a degree of liberty in the regulation dynamics. In this case, it is possible to compensate for a higher beat frequency.

In certain applications, the accuracy of the clock generation circuits may be insufficient to respect the above-mentioned constraints. In this case, the control circuit 132 of the secondary stage may be configured to implement a method of synchronization of the secondary clock on the primary clock.

Figure 6:
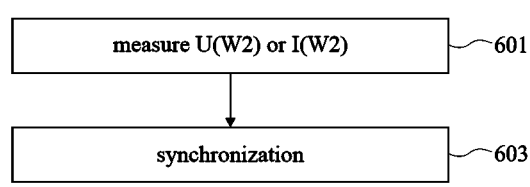
FIG. 6 shows, in the form of blocks, an example of a method of synchronization of a phase-controlled converter according to an embodiment.

FIG. 6 shows, in the form of blocks, an example of a synchronization method implemented by the control circuit 132 of the secondary stage.

The synchronization method of FIG. 6 comprises a phase 601 of measurement, via circuit 132, of a signal representative of the output voltage or current of transformer T. All along measurement 601, the secondary winding W2 of the transformer is short-circuited via the switches of secondary bridge H2. As an example, all along measurement phase 601, switches $S_{21}$ and $S_{22}$ are kept on and switches $S_{23}$ and $S_{24}$ are kept off. As a variant, all along measurement phase 601, switches $S_{23}$ and $S_{24}$ are kept on and switches $S_{21}$ and $S_{22}$ are kept off. The switches of bridge H1 are controlled in switched mode, at the convener cut-off frequency.

During a step 603, circuit 132 detects, from the signal measured at step 601, the sequence of control of the switches of primary bridge H1. Circuit 132 may then synchronize the signals for controlling the switches of secondary bridge H2 with respect to the control sequence of primary bridge H1.

More particularly, in the case where the series inductance $L_r$ of the converter is placed on the side of the secondary stage (configuration of FIG. 2), the signal measured at step 601 may directly be the voltage U(W2) across secondary winding W2. Indeed, in such a configuration, voltage U(W2) is an image of the modulated voltage Vp1 delivered by primary bridge H1, for example, such as illustrated in FIG. 3, to within the transformation ratio of transformer T. Circuit 132 may comprise an edge detector enabling to generate a clock signal from voltage U(W2). This control signal is then used at step 603 to synchronize the control of secondary bridge H2 with respect to the control of primary bridge H1.

In the case where the series inductance $L_r$ of the converter is placed on the side of the primary stage (configuration of FIG. 1), the signal measured at step 601 may be the current I(W2) in the secondary winding W2 of transformer T. Indeed, in such a configuration, an image of voltage $V_{p1}$ is not directly accessible on the side of the secondary stage. Current I(W2) is then trapezoidal the zero crossings of I(W2) corresponding to times 0 and π referenced to the primary. Circuit 132 may detect the zero crossings of current I(W2) and generate a clock signal based on this detection. This control signal is used at step 603 to synchronize the control of secondary bridge H2 with respect to the control of primary bridge H1.

The synchronization method of FIG. 6 may for example be periodically repeated at a predetermined frequency which is a function of the accuracy of the circuits of generation of the clock signals of circuits 112 and 132. As a variant, the method of FIG. 6 may be implemented on request, at any desired time.

Figure 7:
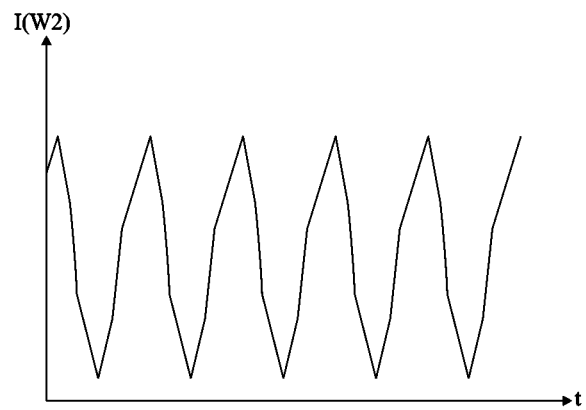
FIG. 7 is a diagram illustrating an example of operation of the synchronization method of FIG. 6.

FIG. 7 is a diagram showing as an illustration the variation over time t (in abscissas) of the current I(W2) in the secondary winding W2 of transformer T in the case of a four-phase control such as described in relation with FIG. 3.

Figure 8:
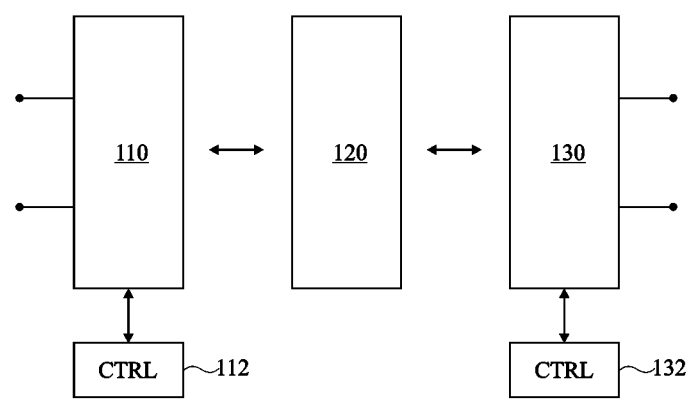
FIG. 8 is a simplified block diagram slowing an example of a phase-controlled converter according to an embodiment.

FIG. 8 is a simplified block diagram more generally showing an example of a phase control converter according to an embodiment.

In the examples described in relation with FIGS. 1 to 7, the convener is a direct conversion AC/DC converter. More generally, it will be within the abilities of those skilled in the art to adapt the described embodiments to any type of phase-controlled switched-mode converter.

In the example of FIG. 8, primary stage 110 comprises at least one cut-off switch (not detailed in the drawing) and is intended to be connected at its input to an AC voltage source, to an AC current source, to a DC voltage source, or to a DC current source.

Secondary stage 130 comprises at least one cut-off switch (not detailed in the drawing) and is intended to deliver an AC voltage, an AC current, a DC voltage, or a DC current.

Isolation stage 120 may comprise a transformer or any other element capable of ensuring the transmission of the modulated electric power between the primary and the secondary with an isolation, galvanic or not, between the primary stage and the secondary stage. As an example, isolation stage 120 is formed by two connection capacitors ensuring a static isolation.

The converter may be unidirectional, that is capable of transferring energy from the primary to the secondary only, or bidirectional, that is, capable of transferred energy, as desired, from the primary to the secondary or from the secondary to the primary.

Figure 9:
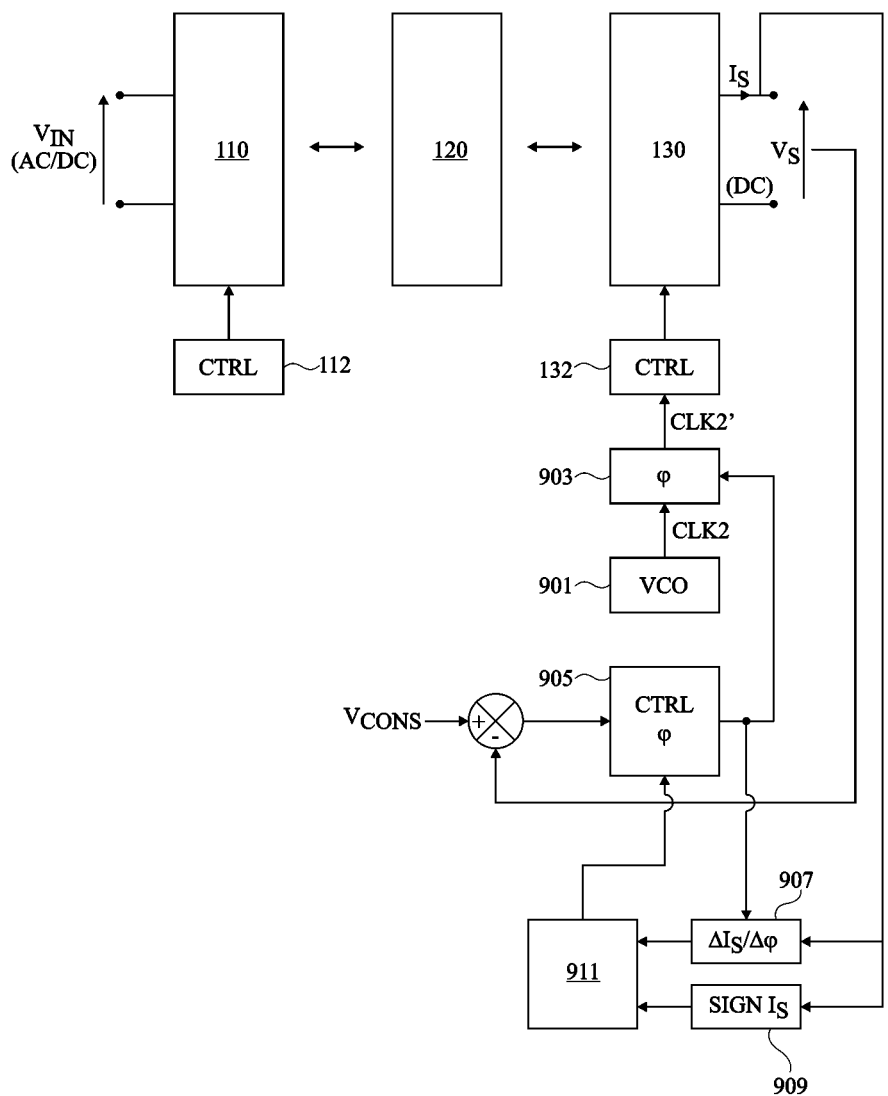
FIG. 9 is a more detailed block diagram illustrating an example of a phase-controlled convener according to an embodiment.

FIG. 9 is a block diagram illustrating in further detail an example of a phase-controlled converter according to an embodiment.

FIG. 9 shows the elements of FIG. 8.

In this example, the convener input voltage $V_{IN}$ may be an AC voltage or a DC voltage, and the converter output voltage $V_S$ is a DC voltage.

FIG. 9 shows, on the secondary side, a circuit 901 (VCO) capable of generating a clock signal CLK2. Circuit 901 is for example coupled to a reference oscillating element (not detailed), for example, a quartz oscillator, enabling to set the frequency of signal CLK2 as currently used.

FIG. 9 further shows a circuit 903 (φ) capable of generating a clock signal CLK2' of same frequency as signal CLK2 but having a phase shift controlled with respect to signal CLK2. Signal CLK2' is delivered to control circuit 132 and is used as a clock signal for the rating of the secondary stage.

FIG. 9 further shows a circuit 905 (CTRL φ) capable of controlling the phase shift φ introduced by circuit 903.

Circuit 905 receives as an input a signal representative of the difference between a set point voltage $V_{CONS}$ and the output voltage $V_S$ of the convener, and accordingly controls phase shift φ.

In the embodiment of FIG. 9, the convener comprises a circuit 907 configured to determine the sign of current $I_S$ (step 501 of the method of FIG. 5).

The convener of FIG. 9 further comprises a circuit 909 configured to determine the sign of ratio $\Delta I_s/\Delta\varphi$ (step 502 of the method of FIG. 5).

The converter of FIG. 9 further comprises a circuit 911 configured to, based on the output signals of circuits 907 and 909, determine the operating range of the converter. According to the identified operating range, circuit 911 controls circuit 905 to possibly, modify the phase shift φ introduced by circuit 903 to change operating range (step 503 of the method of FIG. 5). Circuit 911 may also control a slight variation of phase shift φ (step 502 of the method of FIG. 5) to apply a useful Δφ in the calculation of $\Delta I_s/\Delta\varphi$.

According to an embodiment, not illustrated, it is possible to re-synchronize the circuit (VCO) 901 at a given time by applying the synchronization method illustrated in FIG. 6. For this purpose, control circuit 132 applies the above-described controls to enable to measure U(W2) or I(W2). Circuit 901 (VCO) is then resynchronized, for its frequency and possibly its phase, on the frequency of the primary stage detected by means of the measurements of U(W2) or I(W2). Such a resynchronization may for example be carried out by means of a well-known PLL-type circuit by taking measurement signal U(W2) or I(W2) as a reference signal. Such a resynchronization of the (VCO) circuit frequency may be performed at the starting of the circuit and possibly during its operation by momentary interruption of the standard operation of the elements shown in FIG. 9. Such interruptions for resynchronization of the frequencies of the primary and secondary stages may be provided at regular intervals, or be initiated by a clock drift observation block.

It is for example possible to follow the drift of the frequency of the secondary circuit with respect to that of the primary circuit by following the drift of the data delivered by circuits 907 and 909. Indeed, when the sign of Is changes or when the value of $\Delta I_s/\Delta\varphi$ decreases and becomes zero, a change of operating quadrant can be deduced. It can then be decided to start a method of synchronization of the frequencies of the primary and secondary.

As a variant, particularly if the functions of resynchronization between the primary and secondary stages are not available, the quadrant change information may be used to initiate an operating range selection method such as described hereabove, particularly in connection with FIG. 5. If the frequencies of the primary and secondary stages do not drift too fast with respect to each other, it is then possible to compensate for a slight frequency shift by regularly performing an operating range selection, or on detection of a quadrant change as mentioned hereabove.

The described embodiments advantageously enable to simplify the forming of the control circuits of the primary and secondary stages by suppressing any direct link between the control elements of the primary stage and the control elements of the secondary stage.

The described embodiments are particularly advantageous for wireless energy transmission applications where the primary and secondary stages are totally physically separated. The described embodiments may however have many other applications, for example, in the field of power supplies, for example, power supplies of USB power delivery type which require an isolated AC/DC conversion with a sinusoidal absorption of the input current.

Various embodiments and variants have been described. Those skilled in the art will understand that certain features of these various embodiments and variants may be combined, and other variants will occur to those skilled in the art. In particular, the described embodiments are not limited to the above-described examples of application. It should further be noted that according to the considered application, the control circuit 132 of the secondary stage may be configured to implement the operating range selection method of FIG. 5 and not to implement the synchronization method of FIG. 6, or to implement the synchronization method of FIG. 6 and not to implement the operating range selection method of FIG. 5, or also to implement the operating range selection method of FIG. 5 and the synchronization method of FIG. 6.

What is claimed is:

1. A power converter comprising:
a primary stage comprising at least one first cut-off switch;
a control circuit capable of applying a first control signal to said at least one first switch;
a secondary stage comprising at least one second cut-off switch;
a control circuit capable of applying a second control signal to said at least one second switch;
a power transmission stage coupling the primary stage to the secondary stage,
wherein the control circuit the secondary stage is electrically isolated from the control circuit of the primary stage, and wherein the control circuit of the secondary stage is configured to, during an operating range selection phase, determine, based on a measurement of an output current of the secondary stage or of an output power of the secondary stage, in which operating range among ranges $[-\pi;-\pi/2]$, $[-\pi/2; 0]$, $[0; \pi/2]$, $[\pi/2; \pi]$ a phase shift $\varphi$ between the first signal for controlling said at least one first switch and a signal for controlling said at least one second switch is located,
wherein the control circuit of the secondary stage is capable, during the operating range selection phase, of:
a) determining a direction of transfer of an electric power between the primary stage and the secondary stage;
b) determining the sign of a ratio $\Delta X/\Delta\varphi$ between a variation $\Delta X$ of the electric power transferred between the primary stage and the secondary stage or of an output current ($I_s$) of the secondary stage and a corresponding variation $\Delta\varphi$ of the phase of the second signal for controlling the second switch; and
c) modifying the phase of the second signal for controlling said at least one second switch according to the transfer direction determined at step a) and to the sign of the ratio $\Delta X/\Delta\varphi$ determined at step b), to place phase shift $\varphi$ within range $[-\pi/2; 0]$, or $[0; \pi/2]$.

2. The converter according to claim 1, wherein the control circuit of the secondary stage is configured to, at step c):
if the transfer direction determined at step a) is positive and if the sign of the ratio $\Delta X/\Delta\varphi$ determined at step b) is negative, apply a $-\pi/2$ phase shift to the second signal for controlling said at least one second switch;
if the transfer direction determined at step a) is positive and if the sign of the ratio $\Delta X/\Delta\varphi$ determined at step b) is positive, apply no phase shift to the second signal for controlling said at least one second switch;
if the transfer direction determined at step a) is negative and if the sign of the ratio $\Delta X/\Delta\varphi$ determined at step b) is positive, apply a $\pi/2$ phase shift to the second signal for controlling said at least one second switch; and
if the transfer direction determined at step a) is negative and if the sign of the ratio $\Delta X/\Delta\varphi$ determined at step b) is negative, apply a $\pi$ phase shift to the second signal for controlling said at least one second switch.

3. The converter according to claim 1, wherein the control circuit of the secondary stage is configured to repeat the operating range selection phase each time the converter is started.

4. The converter according to claim 1, wherein the control circuit of the secondary stage is further configured to, during a synchronization phase, based on a measurement of a current or of a voltage in the secondary stage, generate a third signal representative of the first control signal applied to said at least one first switch.

5. The converter according to claim 4, wherein the control circuit of the secondary stage is further configured to, during the synchronization phase, adapt the second signal for controlling said at least one second switch according to the third signal, to synchronize the control of said at least one second switch on that of said at least one first switch.

6. The converter according to claim 5, wherein the control circuit of the secondary stage is configured to periodically repeat the synchronization phase.

7. The converter according to claim 1, wherein the primary stage comprises four first switches forming a first H bridge controlled by the control circuit of the primary stage, and the secondary stage comprises four second switches forming a second H bridge controlled by the control circuit of the secondary stage.

8. The converter according to claim 7, wherein the isolated power transmission stage comprises a transformer.

* * * * *